(12) United States Patent
Batten et al.

(10) Patent No.: US 6,491,830 B1
(45) Date of Patent: Dec. 10, 2002

(54) KITCHEN GREASE REMOVAL SYSTEM

(75) Inventors: William C. Batten, Asheboro, NC (US); Bruce W. Kyles, Asheboro, NC (US)

(73) Assignee: Thermaco, Inc., Asheboro, NC (US)

( * ) Notice: Subject to any disclaimer, the term of this patent is extended or adjusted under 35 U.S.C. 154(b) by 0 days.

(21) Appl. No.: 09/858,858

(22) Filed: May 16, 2001

(51) Int. Cl.[7] .............................. B01D 21/02; C02F 1/40
(52) U.S. Cl. .................... 210/803; 210/525; 210/533; 210/540; 210/521
(58) Field of Search ................... 210/776, 800, 210/803, 523, 525, 533, 534, 535, 536, 537, 538, 540, 521

(56) References Cited

U.S. PATENT DOCUMENTS

| | | | | |
|---|---|---|---|---|
| 1,200,951 A | * | 10/1916 | Kelly, Jr. ................... 210/540 |
| 1,864,511 A | * | 6/1932 | Jones ......................... 210/537 |
| 2,010,540 A | * | 8/1935 | Evnns ......................... 210/523 |
| 2,824,645 A | * | 2/1958 | Grippitl ....................... 210/525 |
| 3,872,017 A | * | 3/1975 | Bishop ........................ 210/525 |
| 4,038,185 A | * | 7/1977 | Kline .......................... 210/525 |
| 4,132,645 A | * | 1/1979 | Bottomley et al. ......... 210/540 |
| 5,360,555 A | | 11/1994 | Batten ......................... 210/803 |
| 5,543,064 A | * | 8/1996 | Batten ......................... 210/523 |
| 5,804,081 A | * | 9/1998 | DeGesero et al. .......... 210/800 |

OTHER PUBLICATIONS

Penberthy Multiview Liquid Level Meter; Information from the internet, copyright 2000.
Anver Vacuum Pumps and Vacuum Generators; information from the internet, copyright 2000.
Jecter: Heavy duty pneumatic conveyor Product Description; information from the internet, undated Thermaco Big Dipper brochure; copyright 1998.

* cited by examiner

Primary Examiner—Christopher Upton
(74) Attorney, Agent, or Firm—MacCord Mason PLLC

(57) ABSTRACT

An oil/grease separation apparatus includes an inlet section for receiving a liquid flow containing water, oil/grease and gross solids. The gross solids are separated from the liquid flow and collected in the inlet section. A water jet eductor is provided having a solids extraction port located in a lower portion of the inlet section. The water jet eductor is actuated by supplying pressurized water to create a suction to extract the accumulated solids from the inlet section. The extracted solids are directed to a separator outlet or to an alternate disposal system by suitable piping.

19 Claims, 6 Drawing Sheets

KITCHEN GREASE REMOVAL SYSTEM

BACKGROUND OF THE INVENTION

The present invention relates to improvements in solids handling for effluent streams containing solids. The typical effluent stream for which the present invention is suitable is the discharge from a kitchen, particularly a restaurant kitchen. Grease traps and oil/grease separators for removal of the oil/grease components from such effluents are known. For example, the Lowe Engineering Company of Lincoln Park, N.J. makes products of this type, as shown in U.S. Pat. Nos. 4,051,024; 4,268,369 and 5,030,357. In addition, Thermaco, Inc. of Asheboro, N.C., manufactures and sells oil/grease removal apparatus under the trademark BIG DIPPER. Exemplary of the patents owned by Thermaco are U.S. Pat. No. 4,235,726 to Shimko, U.S. Pat. No. 5,133,881 to Miller et al., and U.S. Pat. No. 5,360,555 to Batten. The disclosures of these three patents are hereby incorporated by reference. The oil/grease separation devices marketed by Thermaco use various methods for the separation and removal of oil and grease from kitchen effluents, including the gravitational separation techniques and oil-skimming methods shown in the above patents.

Typically, oil/grease separators have infeed units including a straining basket into which the solids are directed and trapped to remove them from the flow so they do not interfere with the oil/grease removal process or with subsequent reprocessing of the removed oil/grease. It is up to a restaurant employee to periodically open the unit and remove the strainer basket and dump its contents. These strainers are objectionable to handle because the solids may have strong odors and liquids may drip out of the basket. Since this is an unpleasant chore, sometimes it's not done. If the strainer basket fills and is not emptied, the grease/oil separator unit may fail and cause the associated plumbing systems to backup.

Clearline Systems, Inc. of Asheboro, N.C. has addressed these problems with strainer baskets as shown in U.S. Pat. No. 5,360,555 to the present applicant by providing a grinder/pump to periodically extract accumulated solids from an oil/grease separator device. The disclosure of this patent is hereby incorporated by reference. While this grinder/pump has proved effective to periodically remove separated and accumulated solids without the problems associated with strainer baskets, such grinder/pumps have some limitations. Grinder/pumps require electric power and periodic maintenance or replacement, and their moving parts may become jammed by certain kitchen solids such as bones, silverware, or rubber gloves. If undetected, lodged solids can cause grinder/pump motors to overheat and become damaged. A safety hazard exists when persons insert their hands into the inlets of such grinder/pumps to remove lodged solids without taking proper safety precautions. Such grinder/pumps often must be removed and disassembled for servicing, typically by a manufacturer's technician, hired plumber or electrician.

Accordingly, there is a need in the art for an improvement in devices of this nature to eliminate the problems caused by the presence of strainer baskets and the limitations of grinder/pumps or other similar mechanical pumps.

Eductors (also known as "injectors", "jet pumps", or "ejectors") are known and operate by taking advantage of the so-called "venturi effect" wherein introduction of a pressurized motive fluid into a cavity creates a suction in the cavity. This suction in turn draws another fluid or a mixture of another fluid and suspended solids into and through the cavity together with the motive fluid. Eductors are relatively simple and inexpensive compared to mechanical pumps. Eductors have no moving parts to wear or become damaged from use, and are therefore extremely durable in operation. In addition, eductors can be easily sized to suit a wide range of pumping demands.

Such eductors have been applied to address a number of needs. For example, U.S. Pat. No. 5,951,878 to Astrom discloses the use of eductors to clean filtrate from a disk filter apparatus. Similarly, U.S. Patent No. 6,083,384 to Al-Ali discloses the use of eductors to retrieve spilled oil. However, eductors have not been used heretofore to address the need for an improved method for removing solids from an oil/grease separation device.

SUMMARY OF THE INVENTION

The present invention fulfills this need in the art by providing an oil/grease separation apparatus including an eductor system for extraction of accumulated solids. In a typical installation, the oil/grease separator includes a chamber having an inlet section for receiving a liquid flow containing water, oil/grease and gross solids, a downstream section for separating the oil or grease from the effluent, and an outlet section for discharge of the residual water through an outlet. The inlet section is provided with a water jet eductor having an extraction port in the lower portion of the inlet section. Gross solids entering the chamber settle in the inlet section where they are periodically removed by actuating the water jet eductor. The water jet eductor is actuated by opening a water supply valve to provide a flow of pressurized water to the eductor through a water supply line. The suction created by the water jet eductor extracts the accumulated solids from the inlet section through the extraction port.

Preferably, the inlet section has a bottom that slopes downwardly toward the extraction port of the water jet eductor to direct accumulated solids toward the extraction port. The apparatus may also include a timer which automatically opens the water supply valve to the eductor for a preset period at a preset time. Alternatively, the water supply valve may be opened by a weight-controlled switch in the inlet section when a preset weight of solids has been collected in the inlet section and closed when the solids have been depleted from the inlet section. The apparatus may also include a grease trap connected to receive the residual water exiting the chamber through the outlet and piping from the water jet eductor that bypasses the grease trap.

Preferably, the jet eductor includes an eductor pipe with a first end in communication with the solids extraction port in a lower portion of the inlet section. The second end of the eductor pipe is connected to the outlet section of the chamber. A jet nozzle is provided in the inlet section of the oil/grease separation apparatus and is positioned to direct a jet of water into the first end of the eductor pipe in the inlet section. This jet of water creates a suction in the eductor pipe which causes a mixture of water and solids accumulated in the inlet section to be extracted from the inlet section through the eductor pipe.

Alternatively, the jet eductor may include an eductor housing in the inlet section of the chamber having a first opening forming a water injection port, a second opening forming a solids intake port, and a third opening in communication with the solids extraction port. A jet nozzle located inside the housing is connected to the water injection port to receive a supply of pressurized water through a supply line and to direct a jet of water through the discharge port. A discharge pipe connects the third opening in the eductor housing to the outlet section of the chamber. The jet of water creates a suction in the housing and discharge pipe, thereby causing the mixture of water and solids accumulated in the inlet section to be extracted from the inlet section through the discharge pipe. In a preferred arrangement, the eductor housing and discharge pipe are located internal to the chamber. Alternatively, the eductor housing and discharge pipe may be external to the chamber. In this alternative installation, the solids intake port in the housing is connected to a penetration in an outer wall of the chamber in a lower portion of the inlet section.

In a typical installation, the oil/grease separation apparatus includes a chamber for receiving a liquid flow containing water, oil/grease and gross solids. The chamber has an inlet section, a downstream section and an outlet in an outlet section. The inlet section is separated from the downstream section by a weir which includes a first wall extending upwardly from the bottom of the chamber to a top above the outlet and a second wall extending downwardly from a height above the liquid level to a submerged level. The weir creates a higher static water level to be maintained in the inlet section than in the downstream section, and facilitates one-way passage of oil/grease from the inlet section to the downstream section. A water jet eductor is provided which has an extraction port in a lower portion of the inlet section for removal of accumulated solids. The inlet section includes an inlet port, a strainer separating the inlet port and the top of the first wall to inhibit the passage of solids to the downstream section, and a bottom which slopes downwardly toward the solids extraction port. An oil/grease separator is located in the downstream section for removing oil/grease from water held in the downstream section. Gross solids entering the chamber settle in the inlet section for periodic removal with some water by the water jet eductor. Oil/grease and water entering the chamber pass to the downstream section where the oil/grease is removed from the water, and the residual water exits the chamber through the outlet section.

The invention also provides an oil/grease separation method that includes the efficient removal of accumulated gross solids. The method includes introducing a liquid flow containing water, oil/grease and gross solids into a chamber having an inlet section, a downstream section and an outlet in an outlet section. The gross solids entering the inlet section are permitted to settle in the inlet section where they are periodically removed with some water by actuating a water jet eductor. Oil/grease and water are permitted to pass from the inlet section to a downstream section where the oil/grease is removed from the water. Finally, the residual water is permitted to exit the chamber through the outlet.

Preferably, permitting oil/grease and water to pass from the inlet section to the downstream section includes passing the oil/grease and water over a weir that maintains a higher static water level in the inlet section than the downstream section. The method also preferably includes straining gross solids from the liquid flow by a strainer in the inlet section to prevent passage of solids to the downstream section. Desirably, the eductor is sized so that the periodic removal of solids creates a reverse flow of water through the strainer to backwash the strainer. The periodic removal of solids may take place for preset periods at a preset times. For example, this may take place for thirty seconds every thirty minutes. Alternatively, the periodic removal of solids may take place when a preset weight of solids has been collected in the inlet section and end when the solids have been depleted from the inlet section. In a typical installation, the method may include directing the residual water exiting the chamber through the outlet section to a grease trap and directing the solids and water removed from the inlet section during the periodic removal step to bypass the grease trap.

The invention may also include a focus plate to concentrate the oil/grease atop the water and a removal means to remove the concentrated oil/grease. The focusing plate may have a ridge aligned with a line between a receiving end and an exit end of the chamber.

BRIEF DESCRIPTION OF THE DRAWINGS

The invention will be better understood from a reading of the detailed description of the preferred embodiments along with a review of the drawings in which.

DETAILED DESCRIPTION OF THE PREFERRED EMBODIMENTS

Figure 1:
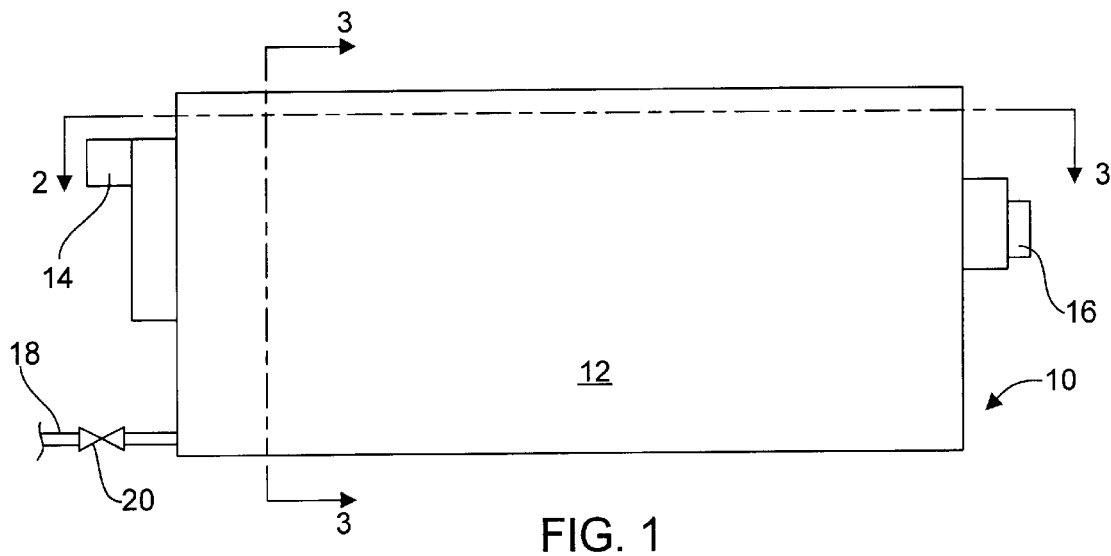
FIG. 1 is side exterior view of a first embodiment of the invention.
Figure 2:
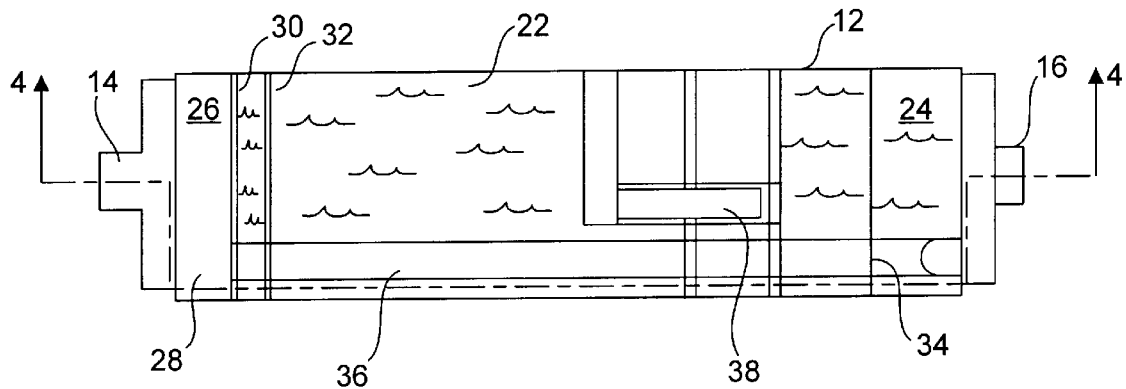
FIG. 2 is a sectional view of the embodiment of FIG. 1, taken along lines 2—2 and looking in the direction of the arrows.
Figure 3:
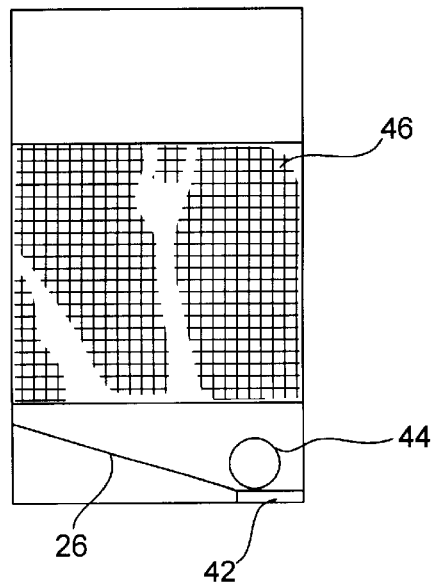
FIG. 3 is a sectional view of the embodiment of FIG. 1, taken along lines 3—3 and looking in the direction of the arrows.
Figure 4:
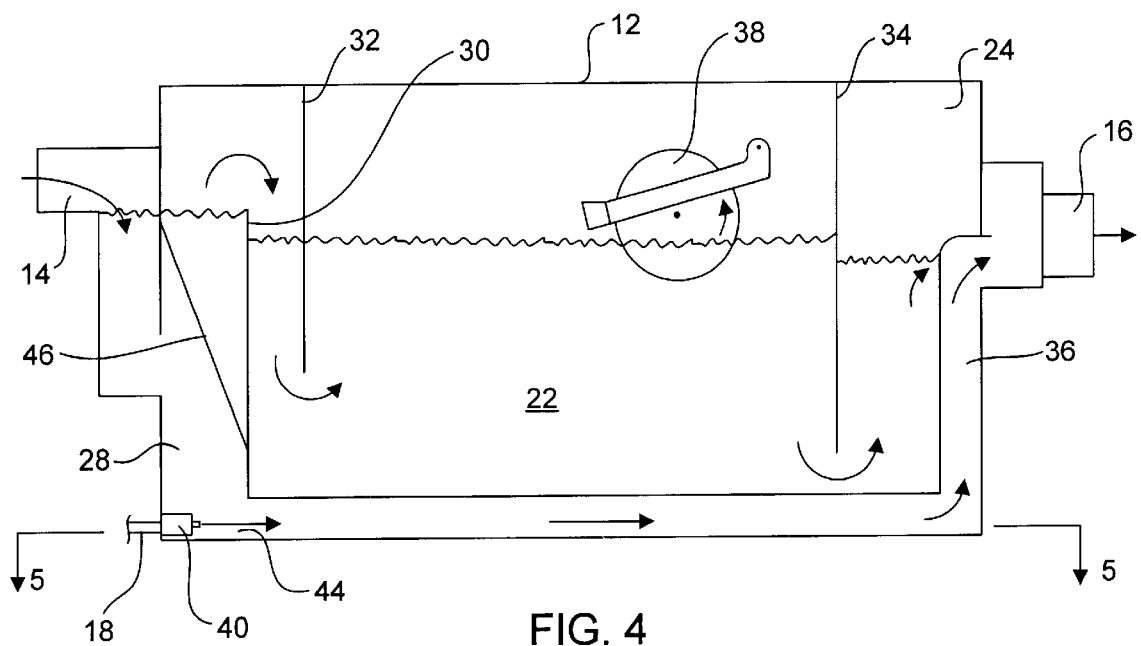
FIG. 4 is a sectional view of the embodiment of FIG. 2, taken along lines 4—4 and looking in the direction of the arrows.
Figure 5:
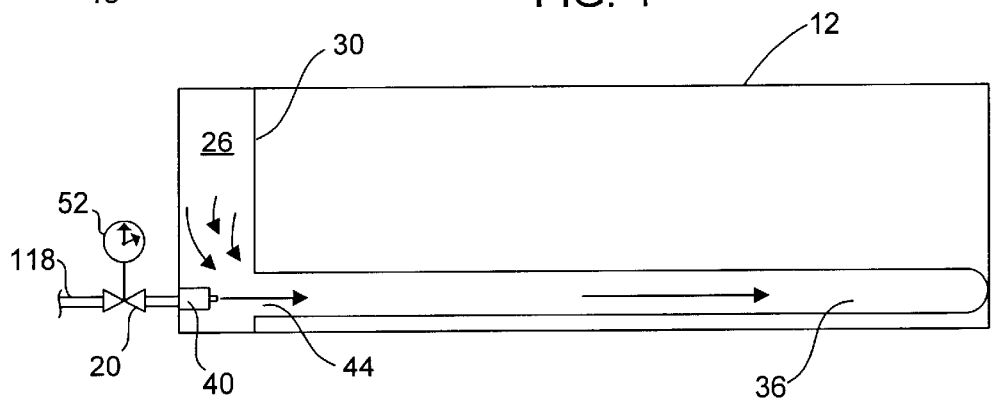
FIG. 5 is a sectional view of the embodiment of FIG. 4, taken along lines 5—5 and looking in the direction of the arrows.

The present invention provides an oil/grease separator 10 including a water jet eductor for extraction and disposal of solids. As seen in FIGS. 1–5, a first embodiment includes a housing 12 having an inlet 14 and an outlet 16. As best seen in FIG. 4, the inlet 14, which can be connected to a discharge from a kitchen sink or the like, deposits kitchen effluent into an inlet chamber 28. The downstream edge of the inlet 28 is defined by a weir 30 upstanding from the bottom portion of the housing 12. A plate 32 extending down from the upper portion of the housing 12 cooperates with the weir 30 to provide a downwardly extending passage into a quiescent region 22. In the quiescent region 22, oil/grease and water reside for a long enough period of time so that the oil/grease floats to the top of the water. The downstream edge of the quiescent region 22 is defined by a baffle 34 extending downwardly from the housing 12. Water passes from the quiescent region 22 to an outlet chamber 24 by passing under the lower edge of the baffle 34. The water is then discharged from the outlet chamber 24 through the outlet 16.

The floating oil/grease can be removed in conventional fashion using any desired oil/grease separator such as those shown in the above-mentioned patents. For example, an oil-grease skimming device 38 may be provided to collect the floating oil/grease from the surface of the water. Alternatively, oil/grease removal methods or apparatus as disclosed in co-pending U.S. patent application Ser. No. 09/439,900 filed Nov. 12, 1999, or U.S. patent application Ser. No. 09/439,542 filed on Nov. 12, 1999, the entire disclosures of which are hereby incorporated by reference, may be used.

As can be best seen in FIG. 4, the inlet chamber 28 is provided with a downwardly extending strainer screen 46 attached to the housing 12 and the weir 30. Alternatively, a wedge-wire strainer basket may be used to prevent solids from passing out of the inlet chamber. As shown in FIG. 3, the inlet chamber 28 is provided with a sloping bottom 26. At the lower part of the sloping bottom is solids extraction port 44 in the weir 30. As best seen in FIG. 4, an eductor pipe 36 communicates with the solids extraction port 44 and extends to the outlet 16. A water jet nozzle 40 in the inlet chamber 28 is positioned to direct a jet of water supplied through a water supply line 18 into the solids extraction port 44. The supply of water to the nozzle 40 is regulated by a water supply valve 20 in the water supply line 18.

Figure 6:
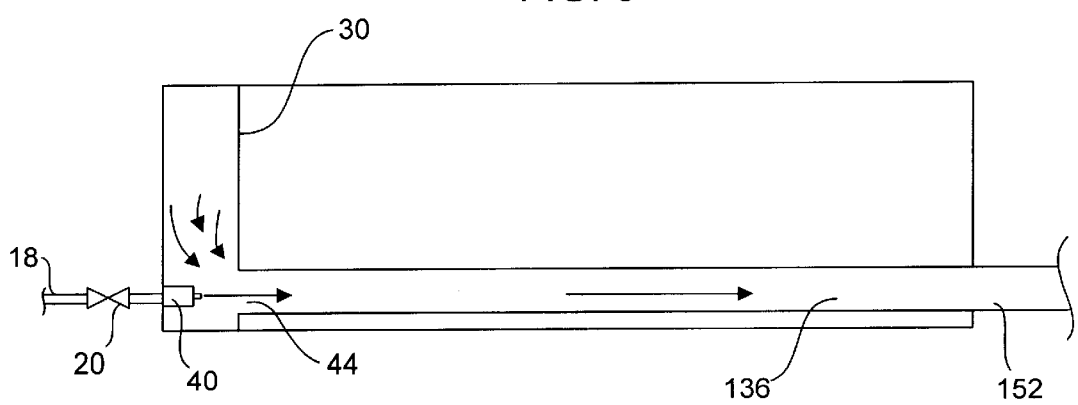
FIG. 6 is a sectional view similar to the view of FIG. 5 showing an alternative piping arrangement.

In operation, oil/grease and solids and water pass into the inlet chamber 28 from the inlet 14. The oil/grease and water pass through the screen 46, over the weir 30, and into the quiescent region 22. However, solids are prevented from passing out of the inlet chamber 28 by the screen 46 and settle atop the sloping bottom 26 in the region of the solids extraction port 44. The accumulated solids are periodically removed from the inlet chamber by opening the water supply valve 18 to direct a jet of water from the nozzle 40 into the solids extraction port 44. The jet of water creates a suction in the eductor pipe 36 at the solids extraction port 44. The solids are thereby drawn from the inlet chamber 28 into the eductor pipe 36 and pass through the eductor pipe 36 to the outlet 16. The solids then pass together with the residual water exiting the outlet 16 to a grease trap. Alternatively, the solids may be directed to independent piping 152 connected to the eductor pipe 136 to bypass the grease trap, as shown in FIG. 6.

As discussed above, the water supply valve 20 is opened to supply water to the nozzle 40 to activate the eductor system to periodically extract the accumulated solids from the oil/grease separator 10. In the embodiment shown in FIG. 5, a timer 52 is used to open the water supply valve 20 at a preset time for a preset period of time to discharge whatever solids may be collected. In an alternate embodiment shown in FIG. 3, a weight-activated micro switch 42 at the bottom of the inlet chamber 28 is used to sense a threshold weight of solids and to open the supply valve 40 to activate the eductor system. Once the solids are substantially depleted from the inlet chamber, the micro switch 42 closes the supply valve 20 to shut off the eductor system. In addition, other control mechanisms for the water supply valve may be substituted, as will be apparent to those skilled in the art. Also, the timer or switch can be used to start a pump or other means for inducing the liquid flow for the eductor.

Figure 7:
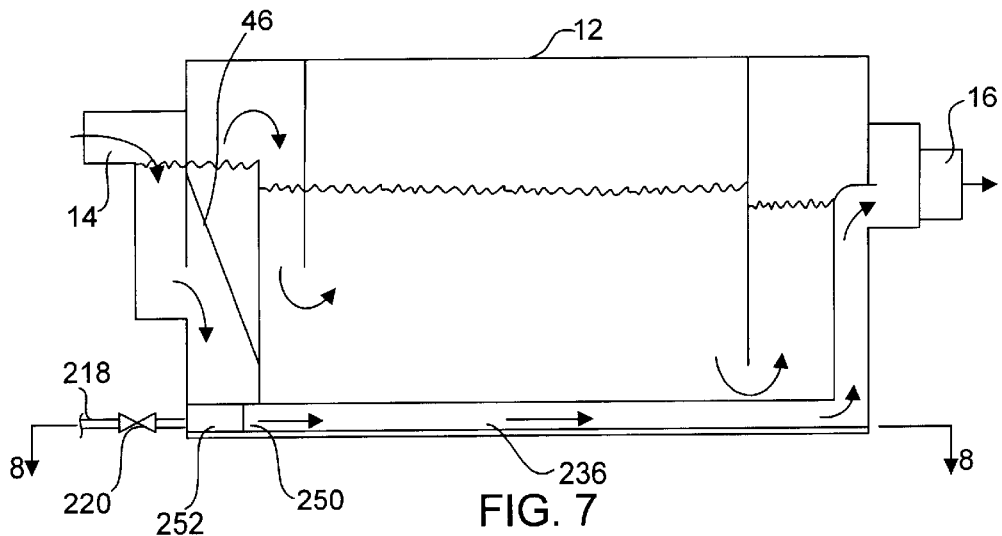
FIG. 7 is a view similar to the view of FIG. 4 of a second embodiment of the invention.
Figure 8:
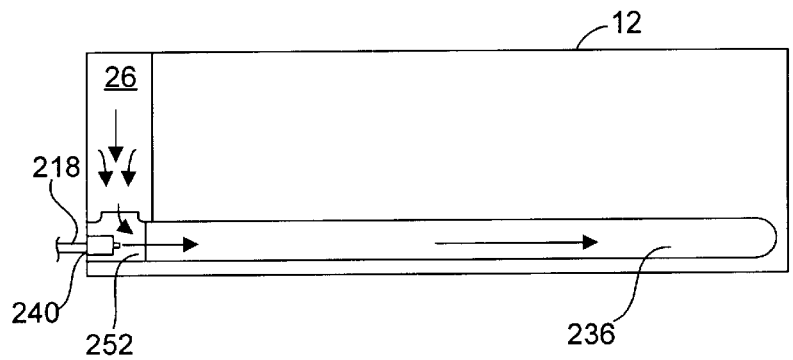
FIG. 8 is a sectional view of the embodiment of FIG. 7 taken along lines 8—8 and looking in the direction of the arrows.
Figure 9:
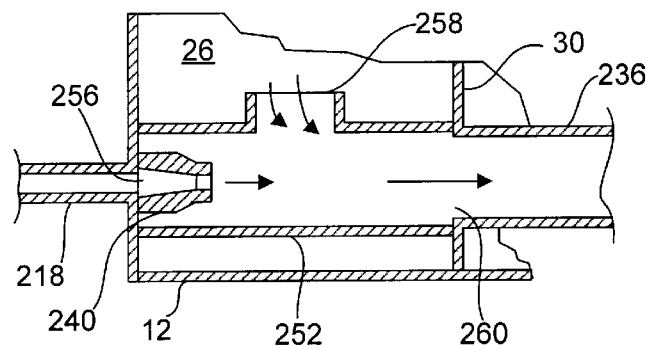
FIG. 9 is an enlarged detail view of the embodiment of FIG. 8.

A second embodiment of the invention is shown in FIGS. 7–9. In this embodiment, an eductor housing 252 is provided at the bottom of the inlet chamber 28 at the base of the sloping bottom 26. As best seen in the enlarged sectional view of FIG. 9, the eductor housing 252 has a water injection port 256, a solids discharge port 260, and a solids intake port 258. As will be appreciated by those of ordinary skill in the art, the eductor housing 252 and its components may have a variety of configurations other than as depicted in the drawings. A water jet nozzle 240 is located inside the eductor housing 252 and is connected to a water supply line 218. The nozzle 240 is positioned to direct a jet of water through the discharge port 260. Alternatively, multiple nozzles 240 may be used in the eductor housing 252 (not shown). The solids discharge port 260 is connected to a discharge pipe 236 which extends either to the outlet 16 of the separator 10 or to independent piping for discharge of the solids. In operation, water is supplied to the nozzle 240 which directs a jet of water through the discharge port 260. A suction is created in the inside the eductor housing 252 which draws solids from the inlet chamber 28 into the housing 252. The solids then pass with water out of the housing 252 through the discharge port 260 and through the discharge pipe 236 for disposal.

Figure 10:
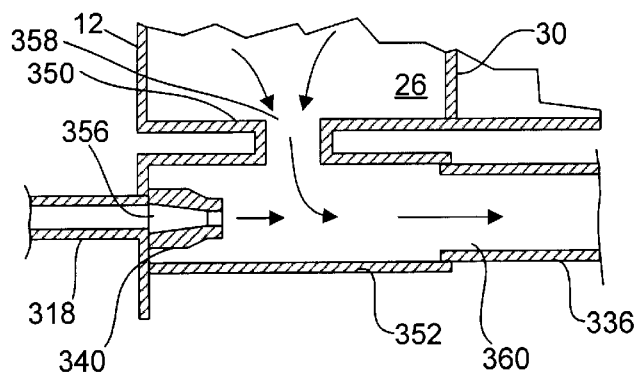
FIG. 10 is a view similar to the view of FIG. 9 showing an alternative arrangement for the eductor housing.

As shown in FIG. 10, the eductor housing 352 may be external to the oil/grease separator housing 12. The solids intake port 358 of the eductor housing 352 communicates with a solids outlet 350 in the housing 12 at the bottom of the inlet chamber 28. A water supply line 318 supplies water to a water jet nozzle 340 inside the eductor housing 352. A solids discharge pipe 336 connects the solids discharge port 360 in the housing 354 either to the separator outlet 16 or to independent piping. In operation, a jet of water from the nozzle 340 creates a suction in the eductor housing 352. This suction causes the solids in the inlet chamber 28 to be extracted from the housing 12 through the solids outlet 350 and the discharge pipe 336.

Figure 11:
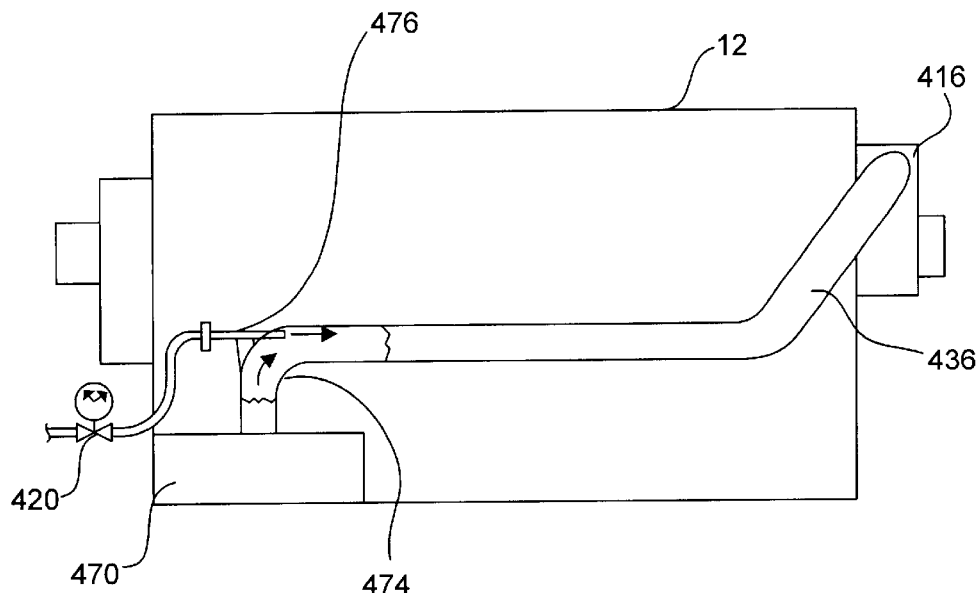
FIG. 11 is a side view and partial section view of a third embodiment of the invention having an eductor system external to the separator.
Figure 12:
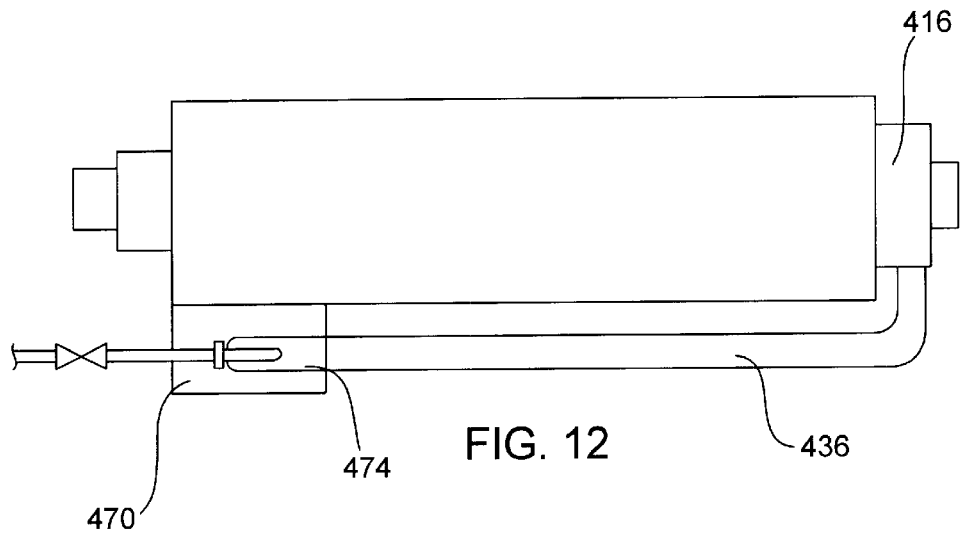
FIG. 12 is a plan view of the embodiment of FIG. 11.
Figure 13:
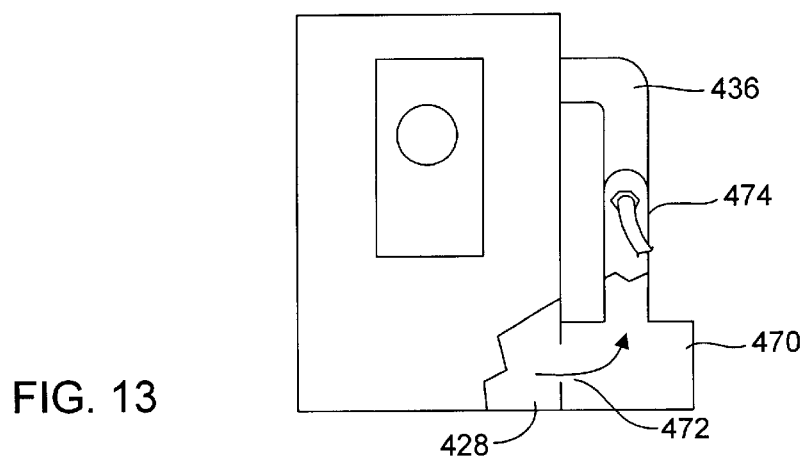
FIG. 13 is an end view of the inlet and of the embodiment of FIGS. 11 and 12.

A third embodiment is shown in FIGS. 11–13, wherein a solids extraction chamber 470 extends from one side of the housing 12. A solids extraction chamber 470 communicates with the inlet section 428 through a window 472. An eductor nozzle 474 has one end connected to an opening in the top of the solids extraction chamber 470 and a second end connected to the outlet 416 by a discharge pipe 436. As best seen in the partial section of FIG. 11, a small-diameter tube 476 extends through a wall of the eductor nozzle 474 to direct a jet of water into the discharge pipe 436. When a water supply valve 420 is opened, a jet of water is injected into the discharge pipe 436, thereby causing solids with water to be drawn from the inlet section 428 into the solids extraction chamber 470 through the nozzle 474 and to the outlet 416 through the discharge pipe 436. Alternatively, the solids can be directed to alternate piping for disposal.

Figure 14:
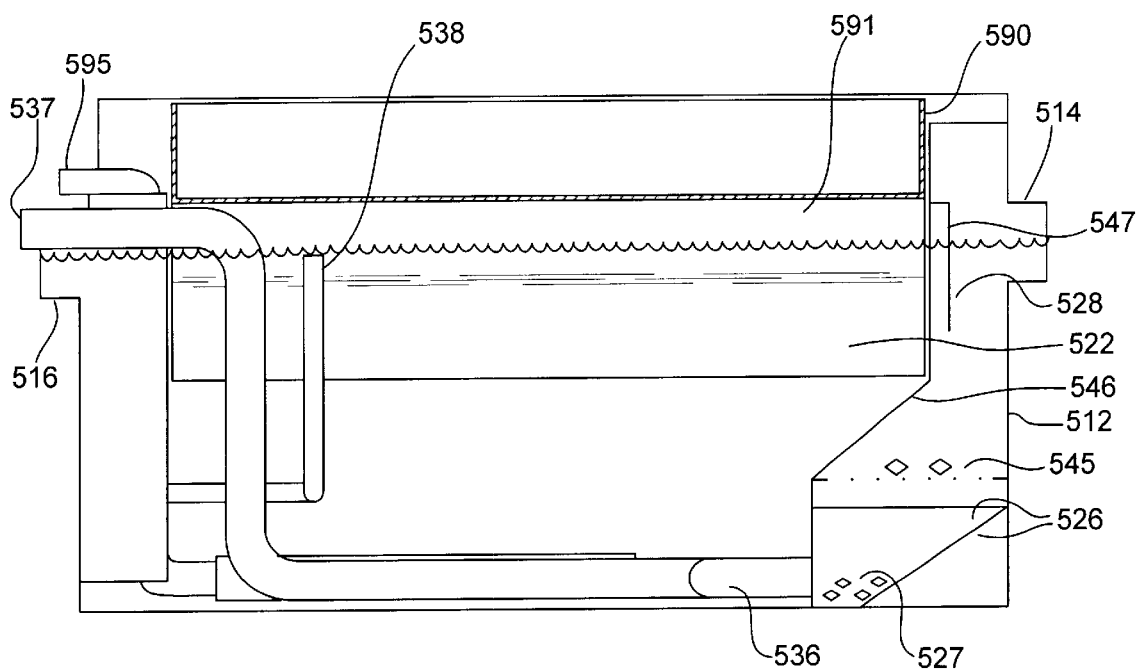
FIG. 14 is a side sectional view of a fourth embodiment taken along line 14—14 in FIG. 15.
Figure 15:
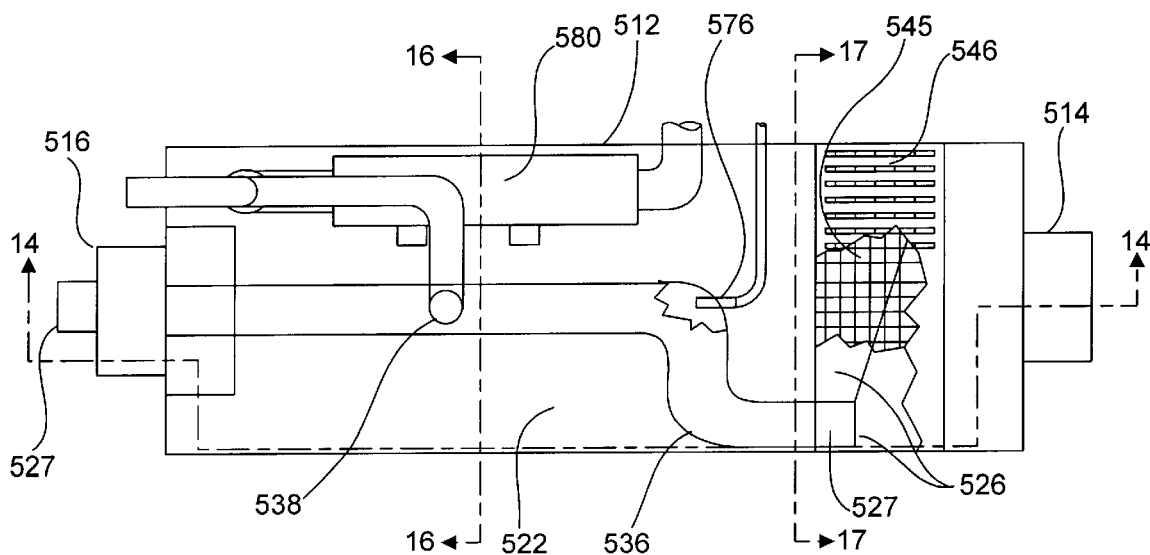
FIG. 15 is a top view of the embodiment of FIG. 14 shown with the focusing plate assembly removed.
Figure 16:
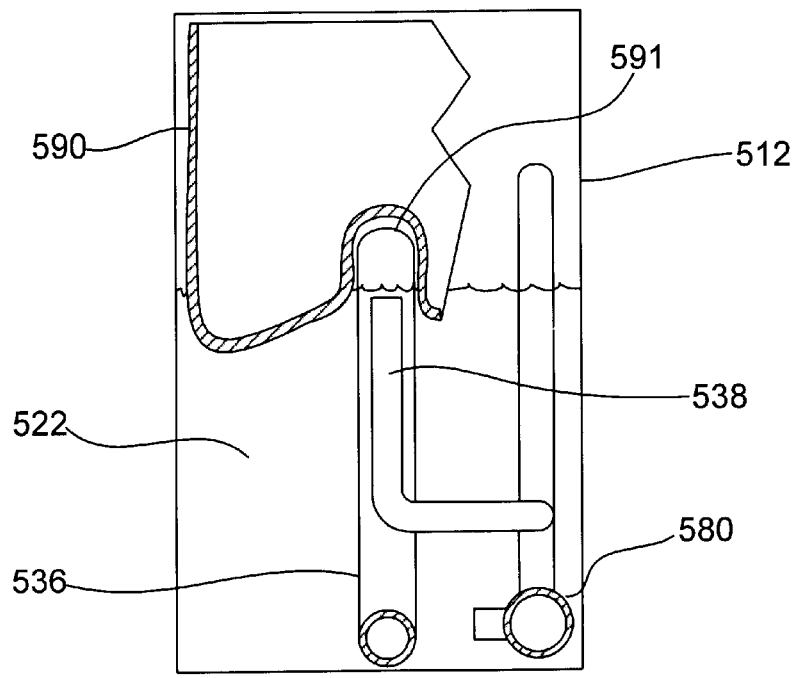
FIG. 16 is a sectional view of the fourth embodiment taken along line 16—16 in FIG. 15.
Figure 17:
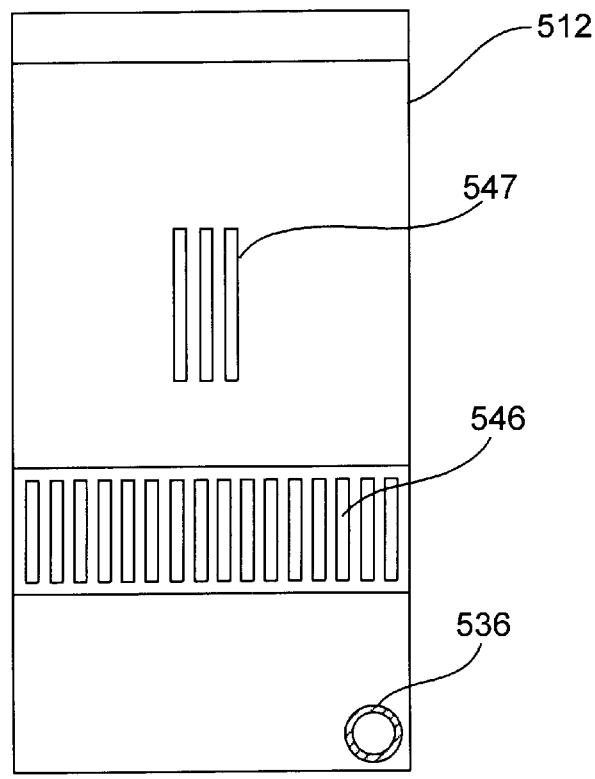
FIG. 17 is a sectional view of the fourth embodiment taken along line 17—17 in FIG. 15.

A fourth embodiment is shown in FIGS. 14–17. A housing 512 has an inlet 514 and an outlet 516. Influent passes through the inlet 514 and into an inlet chamber 528. Heavy solids in the influent settle downwardly in the inlet chamber 528. A grille 545 prevents large solids such as flatware or bones from passing to a lower portion of the inlet chamber 528. Smaller heavy solids pass through the grille 545, and are directed to a solids collection zone 527 by a sloping bottom 526. As best seen in FIGS. 15 and 17, water, oil/grease, and fine floating solids pass from the inlet chamber 528 to a quiescent region 522 through slots 546 and 547. A baffle 548 may be provided in the inlet chamber 528 to prevent the momentum of incoming effluent from causing undue water passage through slots 547.

As best seen in FIGS. 14 and 15, an eductor tube 536 extends from the solids collection zone 527 to an outlet 536. A water injection tube 576 extends into the eductor tube 536 as shown in FIG. 15. As water is injected from tube 576 into the eductor tube 536, accumulated solids are extracted from the collection zone 527 and transferred out through the eductor tube 536 to an outlet 537 for disposal.

As seen best in FIGS. 14 and 16, a focusing plate assembly 590 is provided in an upper portion of the housing 512. Such focusing plates are disclosed in co-pending U.S. patent application Ser. No. 09/439,900 which was incorporated by reference above. As seen best in FIG. 16, the bottom surface of the plate 590 causes oil/grease floating near the top of the quiescent region 522 to concentrate along a central region of the housing. The focusing plate 590 of this embodiment has a peak or ridge 591 that extends along the inlet-outlet axis of the apparatus. This is a presently preferred design to enable manufacturing flexibility. Larger or smaller size units can be made by making the focusing plate longer or shorter without changing the shape of the plate. An oil/grease extraction tube 538 extends upward in the quiescent region to a height just below the static water level in the peak or ridge 591 of the focusing plate 590. Floating oil/grease is extracted through the tube 538 by activating a fluid motivated pump 580, which causes the oil/grease to pass into the tube 538 and out through an exit port 595. Fluid motivated pumps are disclosed in co-pending U.S. patent application Ser. No. 09/567,778, filed May 9, 2000, which is hereby incorporated by reference.

As will be appreciated, other eductor designs other than as specifically depicted and described may be substituted.

As will be apparent to those of ordinary skill in the art, the invention can be adapted to various types of oil/grease separators having solids accumulation capability and is not limited to the specific embodiments discussed above. Those of ordinary skill in the art will also appreciate that the invention could be carried out in other various forms, all of which are deemed to be within the scope of the appended claims.

What is claimed is:

1. An oil/grease separation apparatus comprising:
   a chamber for receiving a liquid flow containing water, oil/grease, and gross solids, the chamber including a housing, an inlet in an inlet section, a downstream section and an outlet in an outlet section,
   a water jet eductor including a water supply line with a water supply valve and including a solids extraction port in a lower portion of the inlet section, and
   an oil/grease separator located in the downstream section for removing oil/grease from water held in the downstream section,
   whereby the gross solids entering the chamber settle in the inlet section for periodic removal by the water jet eductor, oil/grease and water entering the chamber pass to the downstream section where the oil/grease is removed from the water, and the residual water exits the chamber through the outlet section.

2. An oil/grease separation apparatus as claimed in claim 1 wherein the inlet section has a bottom which slopes downwardly toward the solids extraction port of the water jet eductor.

3. An oil/grease separation apparatus as claimed in claim 1 further including a timer which opens the water supply valve to actuate the water jet eductor for a preset period at a preset time.

4. An oil/grease separation apparatus as claimed in claim 1 further including a weight-controlled switch which opens the water supply valve to actuate the water jet eductor when a preset weight of solids has been collected in the inlet section, and which closes the water supply valve to shut off the water jet eductor when the solids have been substantially depleted from the inlet section.

5. An oil/grease separation apparatus as claimed in claim 1 further comprising a grease trap connected to receive the residual water exiting the chamber through the outlet section and piping from the water jet eductor which bypasses the grease trap.

6. An oil/grease separation apparatus as claimed in claim 1 wherein the water jet eductor includes:
   an eductor pipe having a first end in communication with the solids extraction port in a lower portion of the inlet section and a second end connected to the outlet section, and
   a jet nozzle located in the inlet section and positioned to direct a jet of water into the extraction port.

7. An oil/grease separation apparatus as claimed in claim 1 wherein the water jet eductor includes:
   an eductor housing having a first opening forming a water injection port, a second opening forming a solids intake port, and a third opening in communication with the solids extraction port in the inlet section;
   a jet nozzle in the eductor housing connected to the water injection port and directing a jet of water through the discharge port; and
   a discharge pipe having a first end connected to the discharge port and a second end connected to the outlet section of the chamber.

8. An oil/grease separation apparatus as claimed in claim 7 wherein the eductor housing and discharge pipe are external to the chamber and the third opening in the eductor housing is connected to a penetration in the housing of the chamber in the inlet section forming the solids extraction port.

9. An oil/grease separation apparatus comprising:
   a chamber for receiving a liquid flow containing water, oil/grease and gross solids, the chamber including an inlet section, a downstream section and an outlet in an outlet section,
   the inlet section being separated from the downstream section by a weir including a first wall extending upwardly from the bottom of the chamber to a top above the outlet and a second wall extending downwardly from a height above the liquid level to a submerged level, whereby a higher static water level is maintained in the inlet section than the downstream section, to facilitate one-way passage of oil/grease from the inlet section to the downstream section,
   a water jet eductor having an extraction port in a lower portion of the inlet section,
   the inlet section including an inlet port, a strainer separating the inlet port and the top of the first wall to inhibit passage by solids to the downstream section, and a bottom which slopes downwardly toward the extraction port of the water jet eductor, and
   an oil/grease separator located in the downstream section for removing oil/grease from water held in the downstream section, whereby the gross solids entering the chamber settle in the inlet section for periodic removal with some water by the water jet eductor, oil/grease and water entering the chamber pass to the downstream section where the oil/grease is removed from the water, and the residual water exits the chamber through the outlet section.

10. An oil/grease separation method comprising:

introducing a liquid flow containing water, oil/grease and gross solids into a chamber having an inlet section, a downstream section and an outlet in an outlet section, permitting the gross solids entering the inlet section to settle, periodically actuating a water jet eductor to remove the settled solids from the inlet section, permitting oil/grease and water to pass from the inlet section to a downstream section, removing oil/grease from the water in the downstream section, and permitting the residual water to exit the chamber through the outlet.

11. An oil/grease separation method as claimed in claim 10 wherein the periodic actuation of the water jet eductor takes place for preset periods at a preset times.

12. An oil/grease separation method as claimed in claim 10 wherein the periodic actuation of the water jet eductor takes place when a preset weight of solids has been collected in the inlet section and ends when the solids have been depleted from the inlet section.

13. An oil/grease separation method as claimed in claim 10 wherein the inlet section includes an inlet port and a strainer separating the inlet port from the downstream portion to prevent passage of solids to the downstream section and in which the water jet eductor actuation step creates a reverse flow of water through the strainer in order to backwash the strainer.

14. An oil/grease separation method as claimed in claim 10 further comprising directing the residual water exiting the chamber through the outlet section to a grease trap and directing the solids and water removed from the inlet section during the water jet actuation step to bypass the grease trap.

15. An oil/grease separation method comprising:

introducing a liquid flow containing water, oil/grease and gross solids into a chamber having an inlet section, a downstream section and an outlet in an outlet section, straining gross solids from the liquid flow in the inlet section to prevent passage of solids to the downstream section, permitting the gross solids entering the inlet section to settle, periodically actuating a water jet eductor to remove the solids from the inlet section, permitting oil/grease and water to pass from the inlet section to a downstream section over a weir that maintains a higher static water level in the inlet section than the downstream section, removing oil/grease from the water in the downstream section, and directing the residual water exiting the chamber through the outlet section to a grease trap and directing the solids and water removed from the inlet section during the water jet eductor actuation step in a path bypassing the grease trap.

16. An oil/grease separation apparatus comprising:

a chamber for receiving a liquid flow containing water, oil/grease, and gross solids, a water jet eductor including a water supply line with a controllable water supply and including a solids extraction port in a lower portion of the chamber, and an oil/grease separator located in the chamber for removing oil/grease from water held in the chamber, whereby the gross solids entering the chamber settle in the chamber for periodic removal by the water jet eductor, oil/grease and water entering the chamber pass to the oil/grease separator where oil/grease is removed from the water, and the residual water exits the chamber.

17. An apparatus as claimed in claim 16 wherein the separator includes a sloping focusing plate to concentrate the oil grease atop the water and a removal means to remove the concentrated oil/grease.

18. An apparats as claimed in claim 17 wherein the chamber has two ends, the lighter flow is received at one end, the residual water exits from the other end, and the sloping focusing plate has a ridge aligned with a line between the two ends.

19. An oil/grease separation method comprising:

introducing a liquid flow containing water, oil/grease and gross solids into a chamber, permitting the gross solids entering the chamber to settle, periodically actuating a water jet eductor to remove the settled solids from the chamber, removing oil/grease from the water in the liquid flow, and permitting the residual water to exit the chamber.

\* \* \* \* \*